(12) United States Patent
Bovo et al.

(10) Patent No.: US 8,307,097 B2
(45) Date of Patent: Nov. 6, 2012

(54) SYSTEM AND METHOD FOR AUTOMATIC DISCOVERY OF TOPOLOGY IN AN LTE/SAE NETWORK

(75) Inventors: Antonio Bovo, Padua (IT); Xiaoju Chen, Carrollton, TX (US)

(73) Assignee: Tektronix, Inc., Beaverton, OR (US)

( * ) Notice: Subject to any disclaimer, the term of this patent is extended or adjusted under 35 U.S.C. 154(b) by 501 days.

(21) Appl. No.: 12/641,685

(22) Filed: Dec. 18, 2009

(65) Prior Publication Data

US 2011/0153844 A1    Jun. 23, 2011

(51) Int. Cl.
  *G06F 15/16*    (2006.01)
(52) U.S. Cl. ........ 709/228; 709/220; 709/223; 709/243; 370/392; 370/419
(58) Field of Classification Search .................. 709/220, 709/221, 223, 228, 243; 370/389, 392, 419
See application file for complete search history.

(56) References Cited

U.S. PATENT DOCUMENTS

| | | | |
|---|---|---|---|
| 8,094,817 B2 * | 1/2012 | Blom et al. | 380/44 |
| 2009/0129267 A1 | 5/2009 | McNair et al. | |
| 2011/0188403 A1 * | 8/2011 | Calippe et al. | 370/254 |
| 2011/0202647 A1 * | 8/2011 | Jin et al. | 709/223 |
| 2011/0267980 A1 * | 11/2011 | Calippe et al. | 370/254 |
| 2012/0151028 A1 * | 6/2012 | Lu et al. | 709/223 |

* cited by examiner

*Primary Examiner* — Patrice Winder
*Assistant Examiner* — Tauqir Hussain
(74) *Attorney, Agent, or Firm* — Michael J. Fogarty, III

(57) ABSTRACT

A system, method and computer program product are disclosed for monitoring a telecommunications network that comprises a plurality of Mobility Management Entity (MME) nodes and a plurality of evolved UTRAN NodeB (eNodeB) nodes coupled by S1-MME interfaces. A Stream Control Transmission Protocol (SCTP) association identifier is assigned to an SCTP association between interconnected MME and eNodeB nodes. Specific S1-MME messages allow discovering the MME nodes and the eNodeB nodes with their network identifiers, identifying the connections between them and populating proper tables for this topology information.

13 Claims, 8 Drawing Sheets

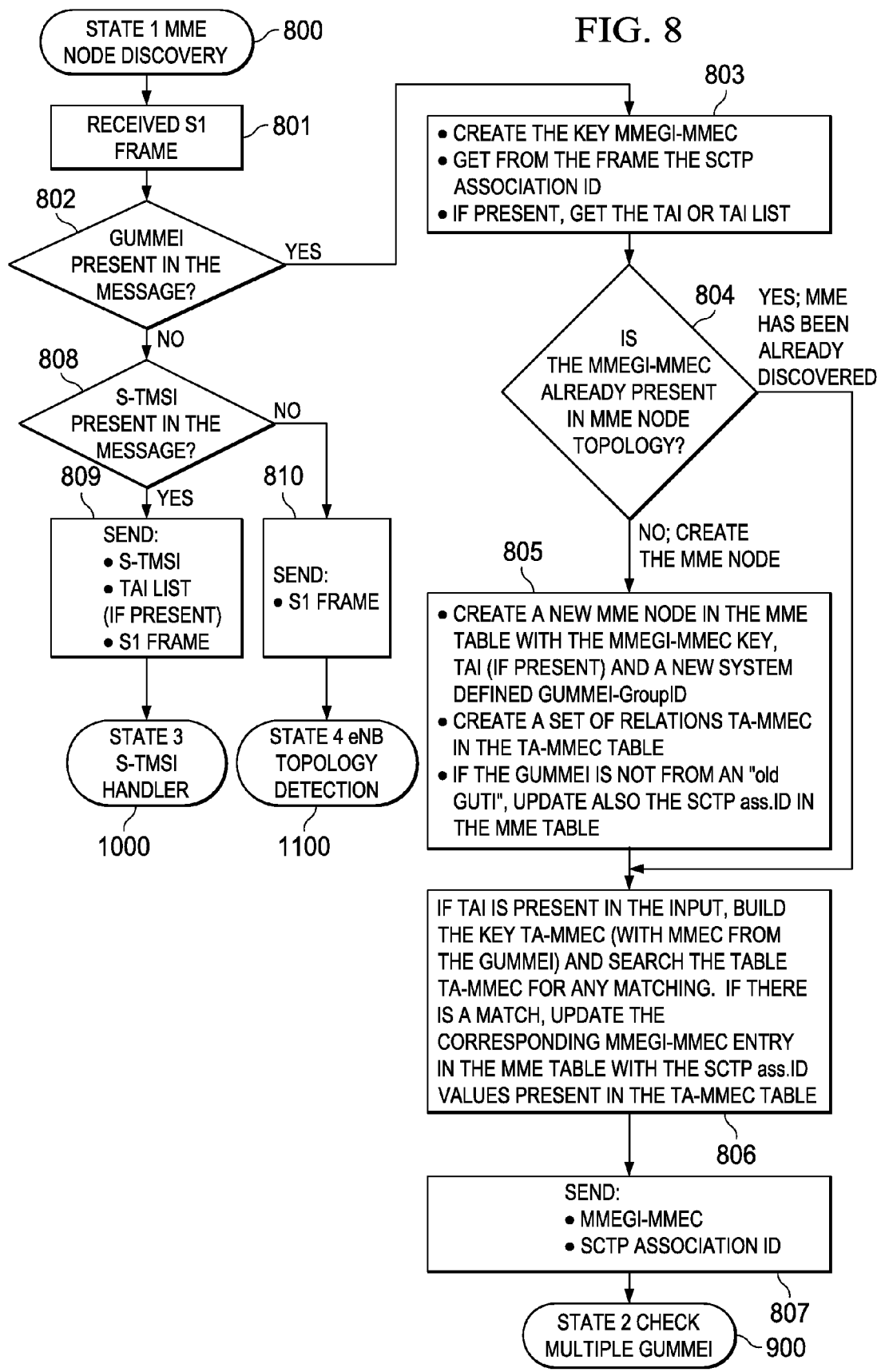

SYSTEM AND METHOD FOR AUTOMATIC DISCOVERY OF TOPOLOGY IN AN LTE/SAE NETWORK

TECHNICAL FIELD

Embodiments are directed, in general, to identifying network nodes and interfaces in a telecommunications network and, more specifically, to identifying evolved UTRAN NodeBs (eNodeB) and Mobility Management Entity (MME) nodes and S1-MME interfaces in a Long Term Evolution (LTE)/System Architecture Evolution (SAE) network.

BACKGROUND

In telecommunications networks, such as LTE/SAE networks, new nodes and links between nodes are added often as the network grows or is updated. In an LTE/SAE network, MME nodes and eNodeBs may be added to increase the network coverage area and number of subscribers supported, for example. New S1-MME links may be added between these nodes. Service providers and network operators typically monitor their network to evaluate operating conditions and to identify and correct network problems. A monitoring system used for this purpose needs to know the up-to-date network topology under test, including the new monitored nodes and links, in order to provide correct and accurate measurements and in addition to correlate the measurements to nodes and links (e.g. correlate the alarms to the network entity affected by such event).

The network topology used by the network monitoring system may be updated manually by entering each new node and all associated new interconnections to other nodes. However, manual configuration of the network topology is not desired because it is labor intensive and error prone. Additionally, such manual topology updates typically are delayed some period of time after actual physical updating of the network. In the time between a network update and a manual topology update, the network monitoring system will not be able to properly analyze network protocols or operation.

SUMMARY

Embodiments of the present invention provide a system and method for autodiscovery of network topology. The network monitoring system, which captures a significant portion of the network packets, may analyze those packets and identify new nodes and interconnections. The network monitoring system collects information regarding new nodes and interconnections and automatically updates the network topology when new network elements are identified.

In one embodiment, a system, method or computer program product monitors a telecommunications network. The network may comprise, for example, a plurality of MME nodes and a plurality of eNodeB nodes. The MME nodes and eNodeB nodes are coupled by S1-MME interfaces. A Stream Control Transmission Protocol (SCTP) association identifier is assigned to an SCTP association between interconnected MME and eNodeB nodes. An exemplary process for assigning SCTP associations to interconnected network nodes is disclosed in U.S. Patent Application Publication No. US 2009/0129267 A1, assigned application Ser. No. 12/096,556, and titled "System and Method for Discovering SCTP Associations in a Network," the disclosure of which is incorporated by reference herein in its entirety. An S1-MME message is captured from the S1-MME interfaces via a monitoring probe in a network monitoring system. An MMEGI-MMEC key is created based on an MME Group Identifier (MMEGI) and an MME Code (MMEC) in the S1-MME message. An SCTP association identifier is assigned to the message and a Tracking Area Identity (TAI) can be identified in the S1-MME message.

The MME topology table entry corresponds to the MMEGI-MMEC key. A TA-MMEC key is created based upon the TAI and MMEC parameters in the S1-MME message. One or more additional SCTP association identifiers are added to the list of SCTP association identifiers in the MME topology table. The one or more additional SCTP association identifiers are from an entry in a TA-MMEC table. The TA-MMEC table entry corresponds to the TA-MMEC key.

The S1-MME message may include a Globally Unique MME Identity (GUMMEI), wherein the MME Group Identifier (MMEGI) and the MME Code (MMEC) are part of the GUMMEI. A new entry is created in the MME node topology table, if the MMEGI-MMEC key is not found in the MME node topology table. The new entry comprises the MMEGI-MMEC key, the TAI, a GUMMEI group identifier, and the SCTP association identifier associated with the S1-MME message. It may require several S1-MME messages to populate all of the fields for the MME node topology table entries because a single S1-MME message may not include all of the data required to complete an entry in the table.

The MME topology table is searched for existing entries that include the SCTP association identifier associated with the S1-MME message. If an existing entry includes the SCTP association identifier associated with the S1-MME message, then the existing entry and the new entry are grouped together in the MME topology table. The existing entry and the new entry may be grouped together by assigning the same GUMMEI group identifier to both entries.

In another embodiment, a system, method or computer program product monitors the telecommunications network. An S1-MME message is captured from the S1-MME interfaces via the monitoring probe. The S1-MME message comprises an S-Temporary Mobile Subscriber Identity (S-TMSI) but not a GUMMEI parameter. An MMEC and Tracking Area Identity (TAI) are identified in the S1-MME message, and a SCTP association identifier is associated with the S1-MME message. The MMEC is part of the S-TMSI. A TA-MMEC key is created based upon the TAI and MMEC parameters. The SCTP association identifier from the S1-MME message is added to a list of SCTP association identifiers for an entry in a TA-MMEC table. The TA-MMEC entry corresponds to the TA-MMEC key. The SCTP association identifier from the S1-MME message is also added to a list of SCTP association identifiers for an entry in the MME topology table. The entry in the MME topology table corresponds to the TA-MMEC key. A new entry is created in the TA-MMEC table if no entry in the TA-MMEC table matches the TA-MMEC key. The new entry includes the SCTP association identifier from the S1-MME message.

In another embodiment, an eNodeB global identifier key is identified in the S1-MME message and an SCTP association identifier is associated with the S1-MME message. The SCTP association identifier from the S1-MME message is added to a list of SCTP association identifiers for an entry in an eNodeB topology table. The entry in the eNodeB topology table corresponds to the eNodeB global identifier key. A new entry is created in the eNodeB topology table if no entry in the eNodeB topology table matches the eNodeB global identifier key. The new entry in the eNodeB topology table comprises the SCTP association identifier associated with the S1-MME message. The new entry in the eNodeB topology table also comprises the eNodeB global identifier key that is part of the monitored eUTRAN CGI (Cell Global Identifier).

An SCTP association identifier is selected from an MME entry in an MME topology table and compared to SCTP association identifiers stored in an entry in the eNodeB topology table. If the selected MME table SCTP association identifier matches one of the eNodeB table SCTP association identifiers, then a new entry is added to an MME-eNodeB links table. The MME-eNodeB links table entry comprising an MME identifier, an eNodeB identifier, and the matching SCTP association identifier. The MME identifier typically comprises the MMEGI, the MMEC, and a Globally Unique MME Identity GUMMEI; and the eNodeB identifier comprises an eNodeB global identifier.

BRIEF DESCRIPTION OF THE DRAWINGS

Figure 1:
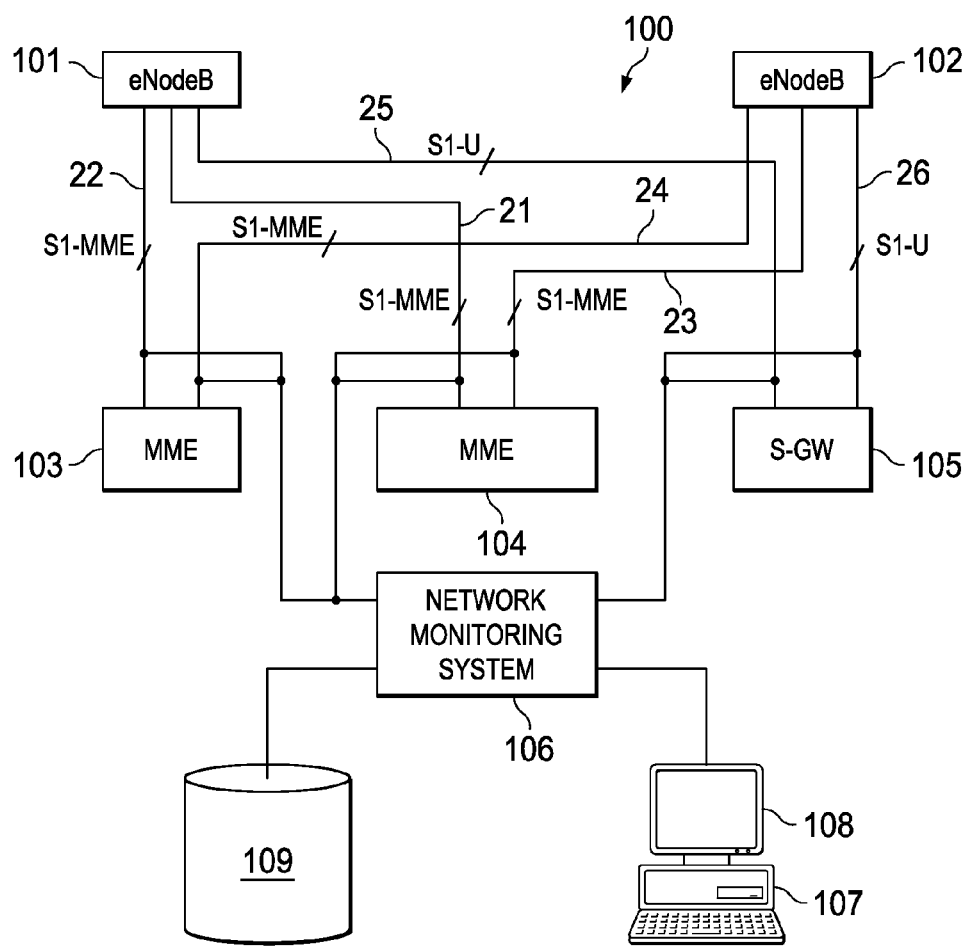
Figure 2:
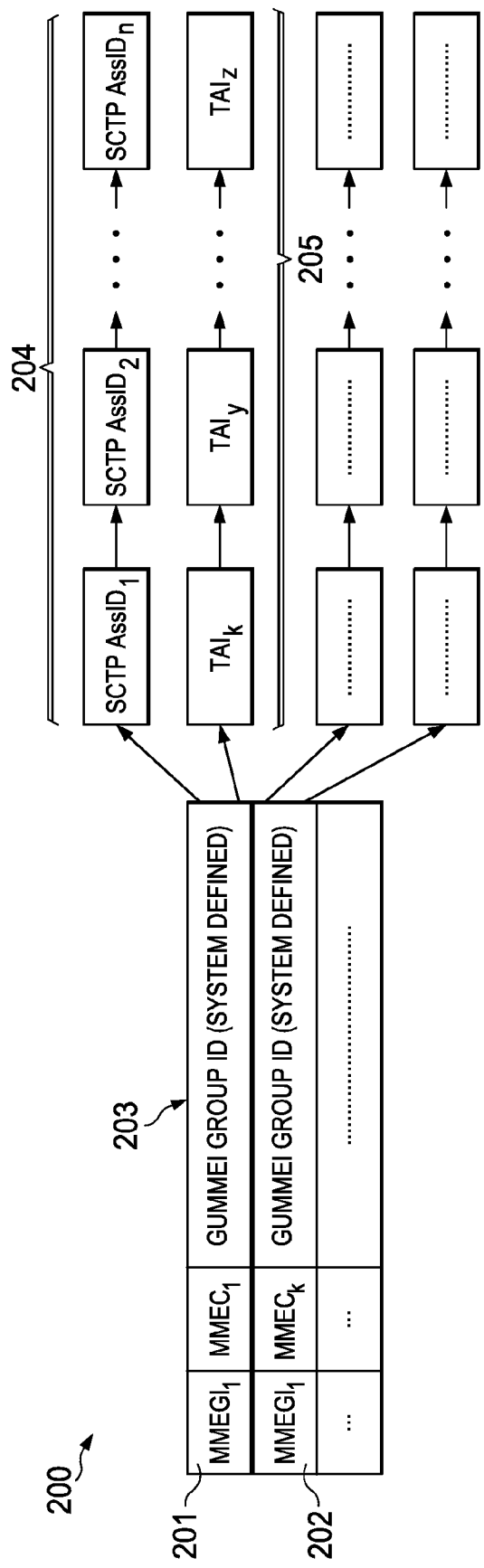
Figure 6:
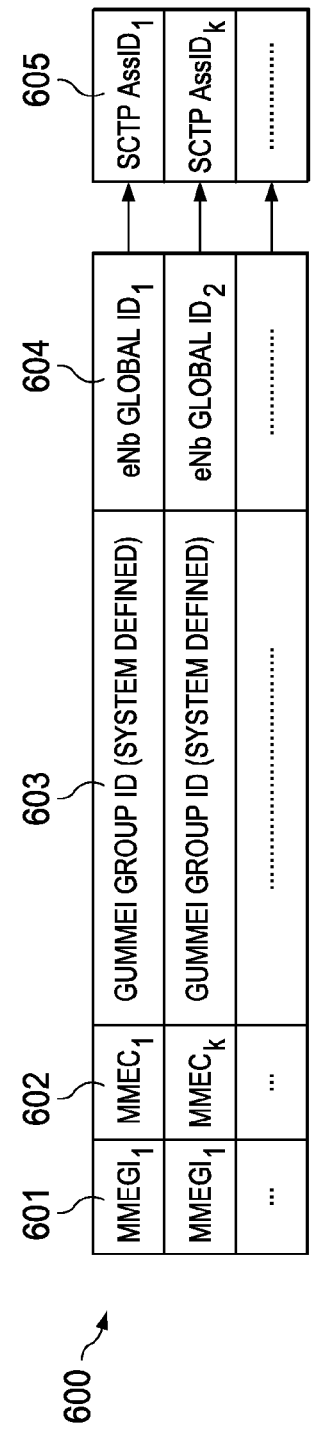
Figure 3:
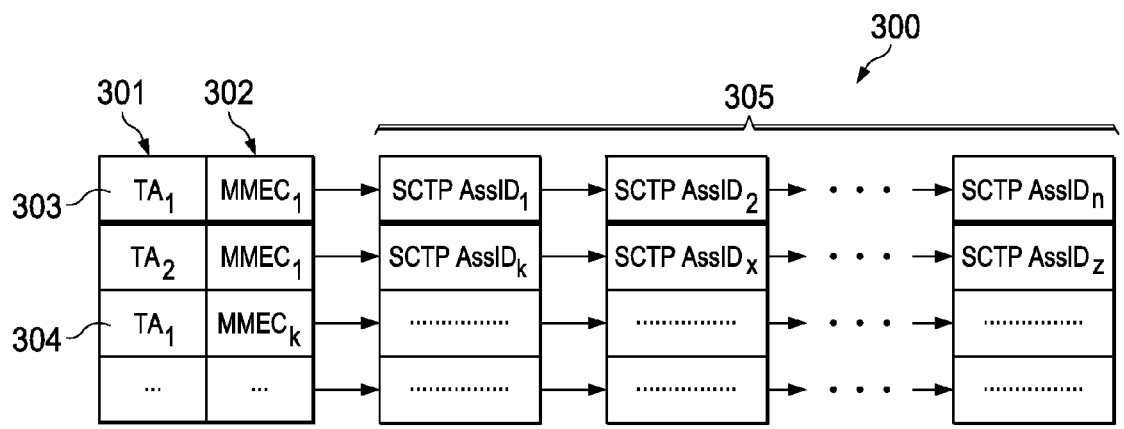
Figure 4:
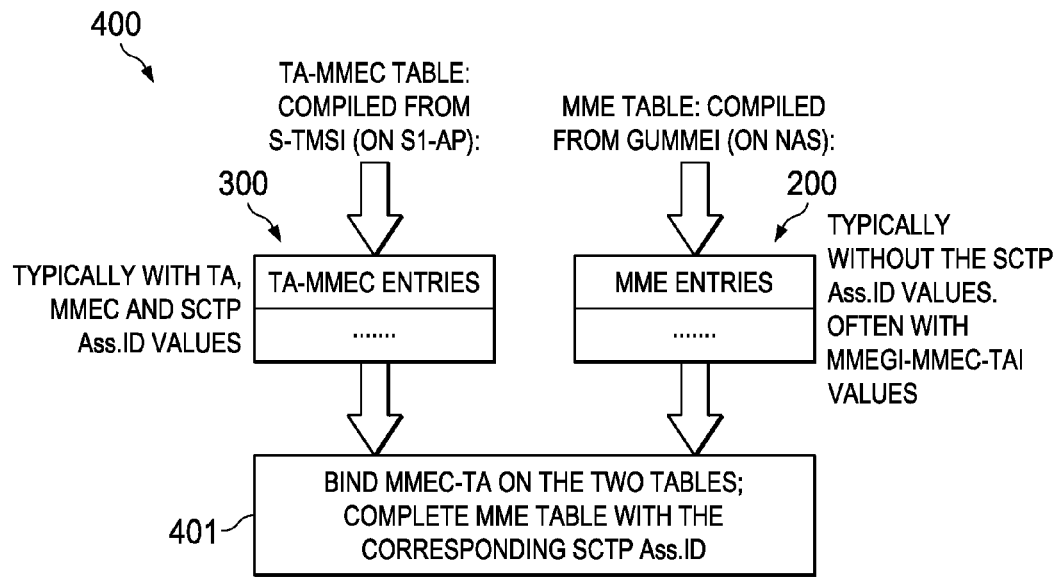
Figure 5:
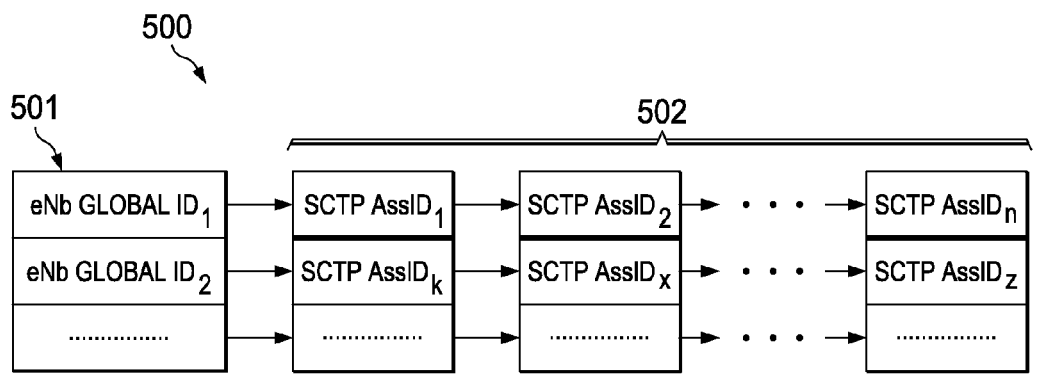
Figure 7:
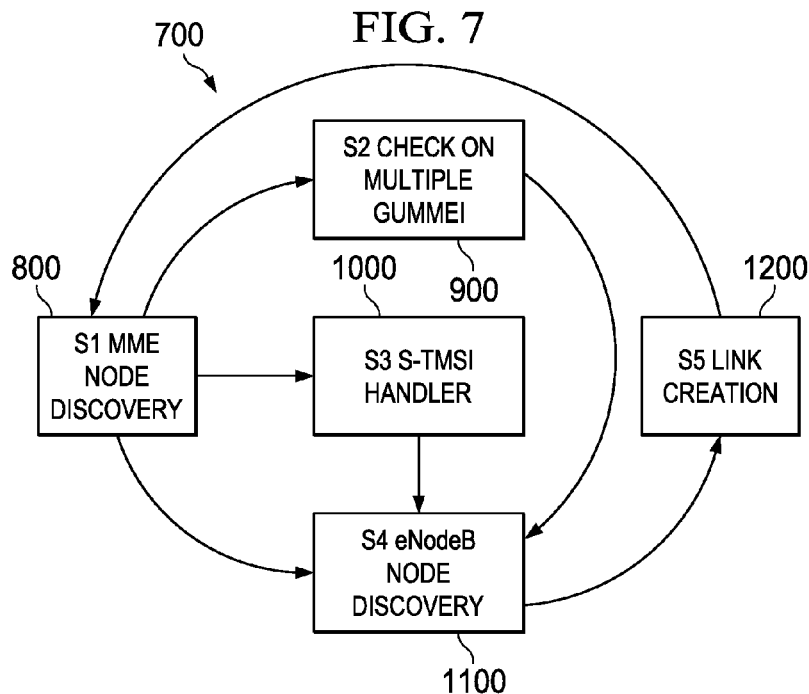
Figure 9:
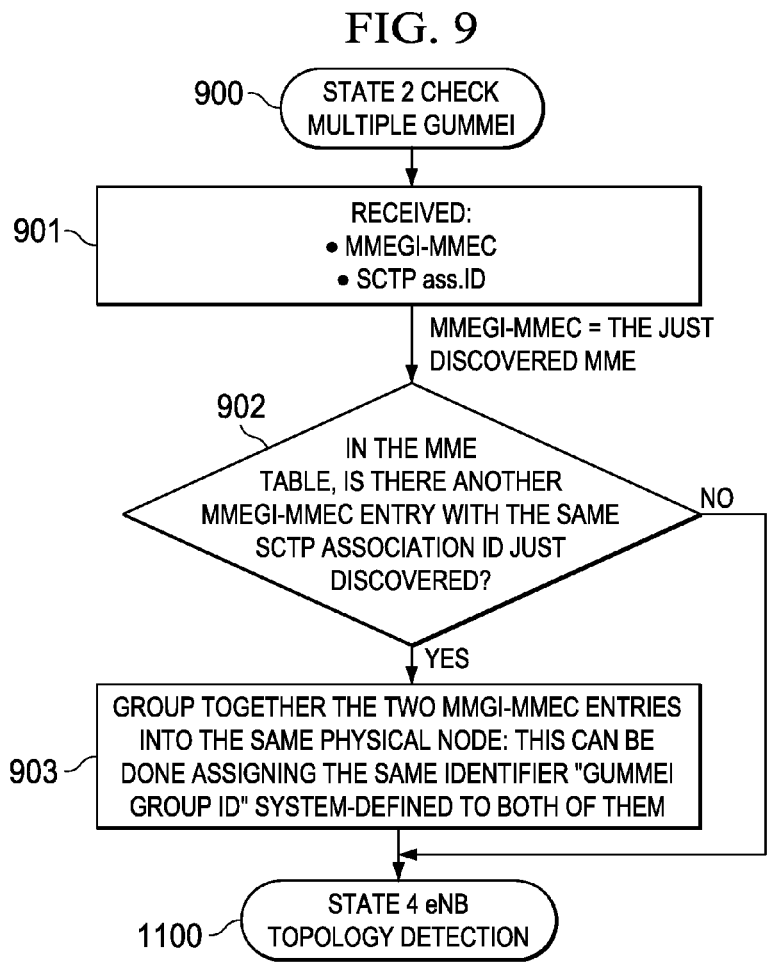
Figure 10:
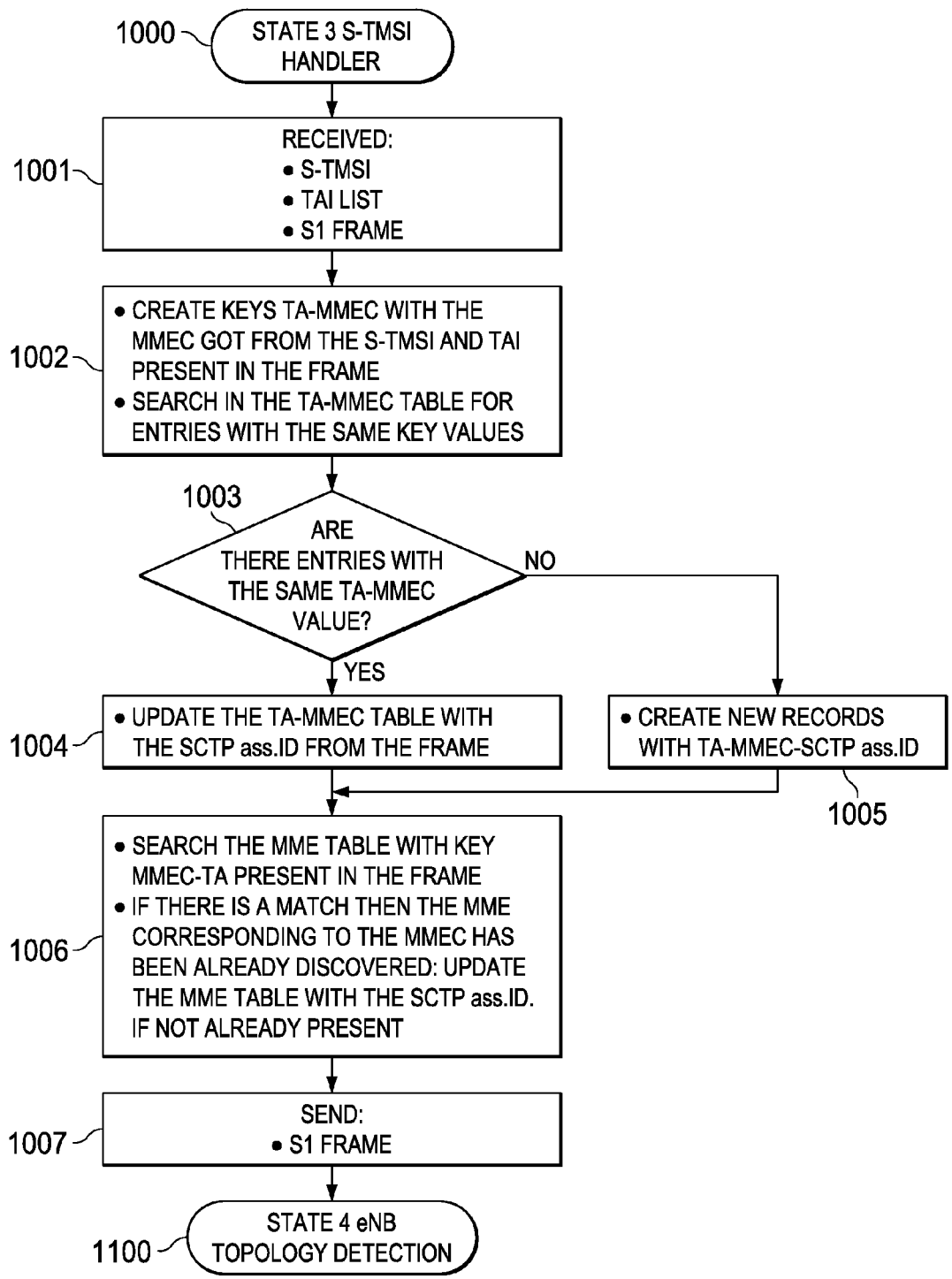
Figure 11:
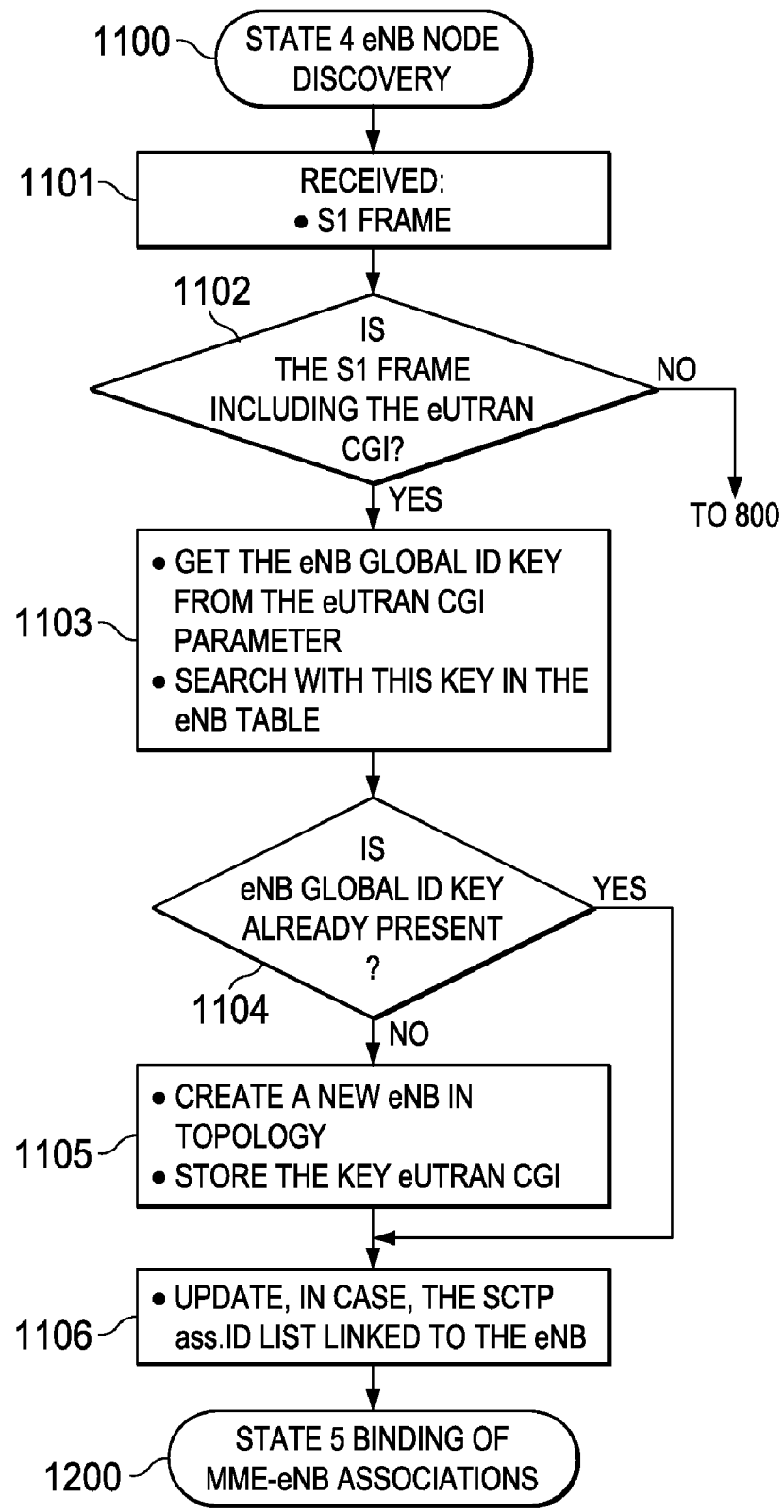
Figure 12:
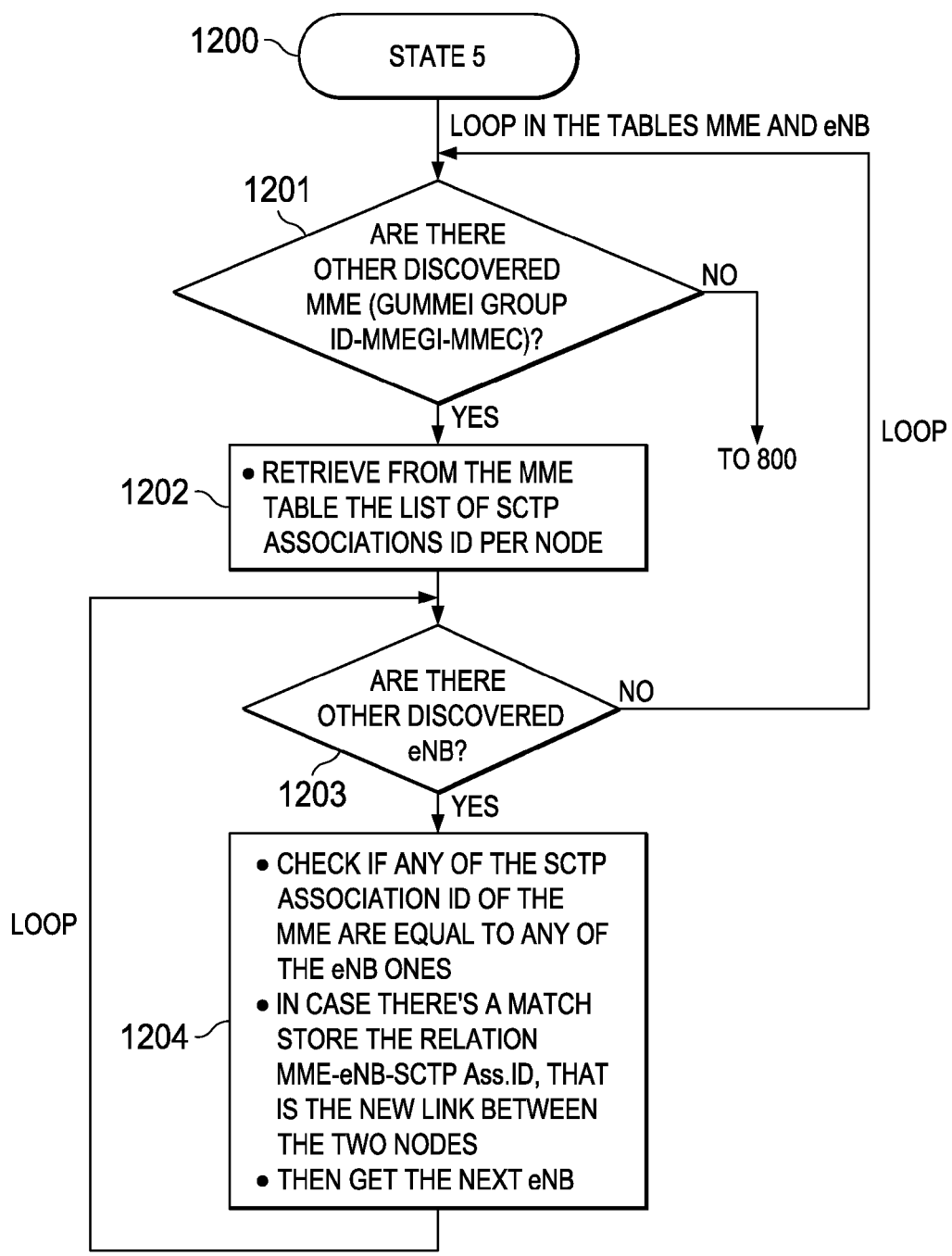

Having thus described the system and method in general terms, reference will now be made to the accompanying drawings, which are not necessarily drawn to scale, and wherein:

FIG. 1 is a high level schematic diagram of LTE/SAE network;

FIG. 2 illustrates an exemplary embodiment of an MME table;

FIG. 3 illustrates an exemplary embodiment of a TA-MMEC table;

FIG. 4 illustrates the relationship between the MME table and the TA-MMEC table;

FIG. 5 illustrates an exemplary embodiment of an eNB table used in the eNodeB discovery;

FIG. 6 illustrates an exemplary embodiment of an MME-eNodeB links table for linking the MMEs and eNodeBs;

FIG. 7 is a high level example of one embodiment of a state machine for discovering MME and eNodeB nodes and binding to them the corresponding SCTP associations;

FIG. 8 is a flowchart for an exemplary MME node discovery process;

FIG. 9 is a flowchart for an exemplary process for evaluating multiple GUMMEI;

FIG. 10 is a flowchart for fan exemplary process for identifying MME nodes;

FIG. 11 is a flowchart for an exemplary process for discovering eNodeB topology; and FIG. 12 is a flowchart for an exemplary process for link creation.

DETAILED DESCRIPTION

FIG. 1 is a high level schematic diagram of LTE/SAE network 100. In a LTE/SAE network, the S1 interface is an interface between an evolved Universal Terrestrial Radio Access Network (eUTRAN) and core network nodes. The S1 interface may be designated as a control plane interface (S1-MME) or a user plane interface (S1-U). In exemplary network 100, eNodeBs 101 and 102 in the eUTRAN are coupled to MMEs 103 and 104 in the core network by S1-MME interfaces 21-24.

MMEs 103 and 104 are the signaling nodes interfacing the eNodeBs on one side and the rest of the packet core network on the other side. The core network is designated as an Evolved Packet Core (EPC) in LTE/SAE. The MMEs are responsible for Non-Access Stratum (NAS) signaling to the user equipment (UE), for mobility handling either inter-MME or inter-RAT (inter-Radio Access Technologies, e.g. UTRAN/GERAN), for initiating paging and authentication of user equipment (UE), for establishing the traffic bearers on the S1 side and on the EPC side as well. The MMEs maintain location information as the list of Tracking Areas where each user can be located. Multiple MMEs can be grouped together in an MME pool to meet the signaling load in the network.

The eNodeBs are enhanced NodeBs that provide the air interface and perform radio resource management in LTE/SAE network 100. Each eNodeB may be coupled to multiple MMEs. Similarly, each MME may be coupled to multiple eNodeBs. Stream Control Transmission Protocol (SCTP) is the transport layer protocol for S1 interface control plane signaling on S1-MME interfaces 21-24. Between a specific pair of eNodeB-MME nodes, there will be only one SCTP association, even if there are multiple IP addresses at either or both node. An SCTP Association Identifier identifies the SCTP association between the two nodes. This parameter can be used to globally identify a specific SCTP association. Embodiments of the present invention correlated each SCTP association to the specific MME and eNodeB nodes to which it refers. An exemplary process for correlating SCTP associations to interconnected network nodes is disclosed in U.S. Patent Application Publication No. US 2009/0129267 A1, assigned application Ser. No. 12/096,556, and titled "System and Method for Discovering SCTP Associations in a Network," the disclosure of which is incorporated by reference herein in its entirety.

Messages exchanged on the control plane interface (S1-MME) are used, for example, to set up calls for the UE. Once the calls are set up, user plane packets are sent from eNodeBs 101 and 102 over the user plane interfaces (S1-U) 25-26 to Serving Gateway (S-GW) 105, which routes and forwards the packets.

During network access, the serving MME allocates a Globally Unique Temporary Identity (GUTI) to the UE. The use of the GUTI avoids the exchange of a UE's permanent identity (International Mobile Subscriber Identity—IMSI) over the radio access link. The GUTI consists of two components: a Globally Unique MME Identity (GUMMEI) and an MME Temporary Mobile Subscriber Identity (M-TMSI). The GUMMEI is the identity of the MME that has allocated the GUTI. The M-TMSI is the identity of the UE within that MME.

The GUMMEI consists of the Public Land Mobile Network (PLMN) Identifier and the MME Identifier (MMEI). The PLMN Identifier consists of the Mobile Country Code (MCC) and Mobile Network Code (MNC). The MMEI consists of the MME Group Identifier (MMEGI) and the MME Code (MMEC). The MMEC provides a unique identity to an MME within the MME pool, while the MMEGI is used to distinguish between different MME pools within the network.

Geographical areas served by the MME pool are designated as Tracking Areas (TA). UEs are located within the TAs, which may be served by one or more MMEs in the pool. The 3GPP specifications define an MME pool area as an area within which a UE may be served without having to change the serving MME. An MME pool area is served by one or more MMEs (i.e. a pool of MMEs) in parallel. The MME pool areas are a collection of complete Tracking Areas, and the MME pool areas may overlap each other. The network operator must ensure that the MMEC is unique within the MME pool area and, if overlapping pool areas are used, the MMEC must be unique within the area of overlapping MME pools.

Based upon these requirements, it is possible to build a relation between

MME pool areas and tracking areas. The following conclusions can be drawn: The MMEC code is unique per MME pool area; the MMEC code is unique within areas of overlapping MME pools; and an MME pool area is a collection of complete TAs. Accordingly, a specific MMEC code is unique per TA. Two MME nodes cannot have the same MMEC code serving the same TA. This rationale is one of the bases for the MME auto-discovery algorithm described herein.

Individual eNodeBs may be designated with a name or other identifier (eNB NAME). Additionally, a global identifier is assigned to each eNodeB (eNB Global ID), which contains the PLMN identity and the eNodeB identity used within the PLMN. An eNodeB can serve one or more cells, each one identified by an eUTRAN Cell Global Identifier (eUTRAN CGI). The eUTRAN CGI contains the PLMN identity and a cell identity.

TABLE 1 is a list of parameters that are useful for auto-discovery of MME and eNodeB topology. TABLE 1 also explains the relationship between the different identifiers. For example, both GUTI and GUMMEI include the global MME identifier (MMEGI-MMEC), and the S-TMSI includes the MMEC identifier, but not the MMEGI.

TABLE 1

| Parameter name | Description |
| --- | --- |
| MME Pool | A set of MMEs that can share the load of a number of eNodeBs. The MME pool covers a complete number of tracking areas. |
| MMEGI | MME Group ID<br>Identifies a MME pool globally in the network. |
| MMEC | MME Code<br>Identifies a specific MME in the pool. |
| GUMMEI | Globally Unique MME Identifier = MCC + MNC + MMEGI + MMEC<br>Identifier of the MME that is globally unique in all the LTE/SAE mobile networks.<br>MCC = Mobile Country Code<br>MNC = Mobile Network Code |
| GUTI | Globally Unique Temporary Identity = GUMMEI + M-TMSI<br>Globally Unique Identifier allocated by an MME to a UE. |
| S-TMSI | S-Temporary Mobile Subscriber Identity = MMEC + M-TMSI<br>Shortened form of GUTI that is unique only within a certain MME. |
| TAC | Tracking Area Code<br>Code identifying a geographical area where the UE can be located. |
| TAI | Tracking Area Identity<br>Identity of the tracking area in the form: MCC + MNC + TAC |
| eNB NAME | Optional identifier that can be assigned to an eNodeB. |
| eNB Global ID | eNodeB Global Identifier = PLMN identity + eNodeB identity<br>Global identifier of the eNodeB.<br>The eNodeB identity is 20 bits long if a "Macro eNodeB" or 28 bits long if a "Home eNodeB."<br>The Macro eNodeB is handling normal cells, while the Home eNodeB is a Femto cell itself. |
| e-UTRAN CGI | e-UTRAN Cell Global Identifier = PLMN identity + Cell Identity<br>The 20 left-most bits of the "Cell Identity" are the "eNodeB identity" in case of normal Macro eNodeB.<br>The entire "Cell Identity" (28 bits) is the "eNodeB identity" in case of Home eNodeB. |

Network monitoring system 106 may be used to monitor the performance of network 100. Monitoring system 106 captures packets that are transported across interfaces 21-26 and any other network links or connections. In one embodiment, packet capture devices are non-intrusively coupled to network links 21-26 to capture substantially all of the packets transmitted across the links. Although only links 21-26 are shown in FIG. 1, it will be understood that in an actual network there may be dozens or hundreds or more of physical, logical or virtual connections and links between network nodes. In one embodiment, network monitoring system 106 is coupled to all or a high percentage of these links. In other embodiments, network monitoring system 106 may be coupled only to a portion of network 100, such as only to links associated with a particular service provider. The packet capture devices may be part of network monitoring system 106, such as a line interface card, or may be separate components that are remotely coupled to network monitoring system 106 from different locations.

Monitoring system 106 preferably comprises one or more processors running one or more software applications that collect, correlate and analyze media and signaling data packets from network 100. Monitoring system 106 may incorporate protocol analyzer, session analyzer, and/or traffic analyzer functionality that provides OSI (Open Systems Interconnection) Layer 2 to Layer 7 troubleshooting by characterizing the traffic by links, nodes, applications and servers on network 100. Such functionality is provided, for example, by the Iris Analyzer toolset available from Tektronix, Inc. The packet capture devices coupling network monitoring system 106 to links 21-26 may be high-speed, high-density 10GE probes that are optimized to handle high bandwidth IP traffic, such as the GeoProbe G10 available from Tektronix, Inc. A service provider or network operator may access data from monitoring system 106 via user interface station 107 having a display or graphical user interface 108, such as the IrisView configurable software framework that provides a single, integrated platform for all applications, including feeds to customer experience management systems and operation support system (OSS) and business support system (BSS) applications, which is also available from Tektronix, Inc. Monitoring system 106 may further comprise internal or external memory 109 for storing captured data packets, user session data, call records and configuration information. Monitoring system 106 may capture and correlate the packets associated specific data sessions on links 21-26. In one embodiment, related packets can be correlated and combined into a record for a particular flow, session or call on network 100.

Network 100 is continually evolving as additional eNodeBs and MMEs are added to the network system and as new interconnections are created either between new network elements or between new and existing network elements. To properly analyze the operation of network 100, monitoring system 106 needs to know the topology of the network, including the existence and identify of all network nodes, such as eNodeBs and MMEs, and the interconnections among the network nodes. In a preferred embodiment of the invention, monitoring network 106 detects the presence of eNodeBs and MMEs and the associated S1-MME interfaces.

The S1-MME interfaces carry S1-AP messages including SCTP TA (transport address) pairs and, for specific messages, the Transport Layer Address (TLA) either of the eNodeB or the S-GW to be used on the S1-U interface. The messages monitored over the S1-MME interfaces may be used by monitoring system 106 for auto-discovery of the MME nodes. The S1 Application Protocol (S1-AP) is used to set up UE-associated logical S1 connections between an eNodeB and an MME. The S1-AP protocol is used to manage such connections and also to send UE-related NAS messages over the S1-MME interface. Other important features of S1-AP concern the support of mobility, the management of the eNodeB-MME connection and the management of RABs (Radio Access Bearers), with all the messages that concern their creation, modification and release.

TABLE 2 lists topology-relevant S1-AP/NAS messages that are monitored for MME node discovery according to an exemplary embodiment of the invention.

TABLE 2

| Message Name/<br>Direction/Layer | Relevant parameters in message fields |
|---|---|
| ATTACH REQUEST<br>Direction: eNB → MME<br>Protocol layer: NAS | "EPS Mobile Identity" in the form of GUTI (for former MME), present if UE has a valid GUTI, or alternatively, in the form of IMSI<br>Last visited registered TAI, present if the UE has a valid TAI to include.<br>Unciphered message |
| TRACKING AREA<br>UPDATE REQUEST<br>Direction: eNB → MME<br>Protocol layer: NAS | GUTI (for former MME)<br>Last visited registered TAI, present if the UE has a valid TAI to include.<br>Unciphered message |
| TRACKING AREA<br>UPDATE ACCEPT<br>Direction: MME → eNB<br>Protocol layer: NAS | GUTI (optional, but present when reallocated)<br>TAI list (optional parameter)<br>Message may be ciphered |
| GUTI REALLOCATION<br>COMMAND<br>Direction: MME → eNB<br>Protocol layer: NAS | GUTI<br>TAI list (optional parameter)<br>Message may be ciphered |
| ATTACH ACCEPT<br>Direction: MME → eNB<br>Protocol layer: NAS | GUTI (optional, but present when reallocated)<br>TAI list<br>Message may be ciphered |
| DETACH REQUEST<br>(UE originated)<br>Direction: eNB → MME<br>Protocol layer: NAS | GUTI (if UE has a valid GUTI, alternatively, IMSI)<br>Message may be ciphered |
| PAGING<br>Direction: MME → eNB<br>Protocol layer: S1-AP | List of Tracking Area Identities (TAI)<br>UE Paging Identity (S-TMSI, or IMSI if no valid S-TMSI) |
| INITIAL UE MESSAGE<br>Direction: eNB → MME<br>Protocol layer: S1-AP | Tracking Area Identity (TAI)<br>S-TMSI<br>The S-TMSI is an optional parameter but, if the eNodeB receives S-TMSI via the radio interface, it is included in S1-AP. |
| MME CONFIGURATION<br>UPDATE<br>Direction: MME → eNB<br>Protocol layer: S1-AP | MME NAME (optional parameter)<br>List of GUMMEIs |
| S1 SETUP RESPONSE<br>Direction: MME → eNB<br>Protocol layer: Sl-AP | MME NAME (optional parameter)<br>List of GUMMEIs |

The messages in TABLE 2 are useful in embodiments of an auto-discovery algorithm. Some messages, such as the ATTACH REQUEST, TRACKING AREA UPDATE REQUEST, PAGING, and INITIAL UE MESSAGE, are more important or useful than the other messages because they are unciphered and occur quite frequently.

TABLE 3 lists topology-relevant S1-AP messages that are monitored for eNodeB discovery according to an exemplary embodiment of the invention.

TABLE 3

| Message Name/<br>Direction/Layer | Relevant parameters in message fields |
|---|---|
| S1 SETUP REQUEST<br>Direction: eNB → MME<br>Protocol layer: S1-AP | eNB NAME<br>eNB Global ID |
| HANDOVER NOTIFY<br>Direction: eNB → MME<br>Protocol layer: S1-AP | eUTRAN CGI (including eNB Global ID) |
| PATH SWITCH<br>REQUEST<br>Direction: eNB → MME<br>Protocol layer: S1-AP | eUTRAN CGI (including eNB Global ID) |
| INITIAL UE MESSAGE | E-UTRAN CGI (including eNB Global ID) |

TABLE 3-continued

| Message Name/<br>Direction/Layer | Relevant parameters in message fields |
|---|---|
| Direction: eNB → MME<br>Protocol layer: S1-AP | |
| LOCATION REPORT<br>Direction: eNB → MME<br>Protocol layer: S1-AP | eUTRAN CGI (including eNB Global ID) |
| UPLINK NAS<br>TRANSPORT<br>Direction: eNB → MME<br>Protocol layer: S1-AP | eUTRAN CGI (including eNB Global ID) |
| CELL TRAFFIC TRACE<br>Direction: eNB → MME<br>Protocol layer: S1-AP | eUTRAN CGI (including eNB Global ID) |

Embodiments of the present invention comprise a topology application that applies an algorithm to determine a network's topology. The algorithm uses S1-MME messages and the parameters in those messages to discover and identify MME nodes and eNodeBs in the network. The basic assumptions for the algorithm are that:

every protocol data unit (PDU) comes to the topology application associated together with an SCTP ASSOCIATION ID, which identifies the SCTP association to which the PDU belongs. The SCTP association ID is assigned by a separate application that is focused on the auto-discovery of the SCTP associations; and the NAS protocol may be encrypted.

The S1 node autodiscovery algorithm has the following goals:

discover the MME nodes as identified by the MMEGI-MMEC values;

manage the scenario in which a physical MME node can own multiple MMEGI-MMEC codes by grouping together all the identifiers and assigning them to the same unique physical node;

discover the eNodeB nodes as identified by the eNodeB Global ID;

assign the proper SCTP associations to the discovered nodes.

The algorithm may be embodied as a state machine that receives S1-MME frames as the input and provides the network topology (i.e. nodes with the linked SCTP associations) as the output. In one embodiment, the S1 node autodiscovery algorithm uses a data model comprising four different tables, which may be hash tables, for example. The data model tables and their contents are used in the state machine. The four tables are:

MME table
TA-MMEC table
eNB table
MME-eNB link table

FIG. 2 illustrates an exemplary embodiment of an MME table 200. Each row 201, 202 of the MME table describes an MME logical node. In some situations, a single physical MME node may correspond to multiple logical MME nodes. For example, logical node $MMEGI_1$-$MMEC_1$ (201) and $MMEGI_1$-$MMEC_K$ (202) are different logical MME nodes that may reside on the same physical MME node. The value of the GUMMEI GROUP ID parameter 203 will be the same for all of the MME logical nodes that are associated with the same physical MME node. The GUMMEI GROUP ID identifier is a system-defined parameter, not a 3GPP protocol parameter. Each logical MME 201, 202 has a list of SCTP associations 204 and a list of tracking areas 205. The SCTP associations 204 are toward the eNodeBs, but MME table 200 does not contain relations to each specific eNodeB.

FIG. 3 illustrates an exemplary embodiment of a TA-MMEC table 300, which contains parameters that describe the relation between each Tracking Area (TA) 301 and the MMECs 302 serving the TA. Several MMECs may serve the same TA, as shown in entries in table 300. For example, in entries 303 and 304, $MMEC_1$ and $MMEC_K$ both serve $TA_1$. Each TA-MMEC entry is linked to the SCTP Association IDs 305 of the frames that carried the TA-MMEC information.

FIG. 4 illustrates the relationship between MME table 200 and TA-MMEC table 300. The content of MME table 200 is completed using the content from TA-MMEC table 300 to provide the final topology. The MME and TA-MMEC tables are compiled using two different set of parameters. The MME entries in table 200 are typically complied without the SCTP Association ID values. On the other hand, the TA-MMEC entries in table 300 typically include the SCTP Association ID values (305). The entries in each row of MME table 200 are completed using the content of TA-MMEC table 300 (401). The algorithm can bind together entries from each table using the MMEC-TA values that are present in both tables. Once an MME table entry is identified as a match in the TA-MMEC table, then the MME table entry is completed with the corresponding SCTP Association IDs in the TA-MMEC table.

FIG. 5 illustrates an exemplary embodiment of an eNB table 500 used in the eNodeB discovery. The eNodeBs are identified by their Global ID 501. A list of SCTP Association IDs 502 is linked to each Global ID entry. The SCTP associations 502 are toward the MME.

FIG. 6 illustrates an exemplary embodiment of table 600 for linking the MMEs and eNodeBs. MME-eNodeB links table 600 shows the information collected for each S1-MME link between an MME and an eNodeB. The links are identified by the identifiers of the node endpoints 601-604 and the unique SCTP association ID 605. The MME nodes are identified by MMEGI 601, MMEC 602 and GUMMEI GROUP ID from Table 200 (FIG. 2), and the eNodeBs are identified by eNB Global ID from Table 500.

As noted above, the S1 node autodiscovery algorithm may be embodied as a state machine. FIG. 7 is a high level example of one embodiment of a state machine 700 for discovering MME and eNodeB nodes and the corresponding SCTP associations. In State 1 (800), the algorithm discovers MME Nodes and moves to one of several other states. In State 2 (900), the algorithm checks whether multiple logical MME nodes should be grouped in the same physical MME node and then moves to State 4. In State 3 (1000), the algorithm handles the S-TMSI parameter and completes the discovery of MME nodes and then moves to State 4. In State 4 (1100), the algorithm discovers eNodeB nodes, and then moves to State 5 (1200) which binds the SCTP Association ID to the nodes. Each of these states is described in more detail below in connection with FIGS. 8-12.

FIG. 8 is a flowchart for an exemplary MME node discovery process in State 1 800. State 1 is the basic state for MME node discovery. Depending on the parameters present in an S1-MME frame, a new MME may be discovered directly in this state, or it is moved to another state either for handling partial information present in the S-TMSI or for eNodeB discovery. The MME topology is detected based upon an analysis of the GUMMEI and S-TMSI values present in captured S1-MME frames. New MME entries are created in the MME tracking table if the node has not previously been detected. After evaluating the S1-MME message for new MME nodes, the frame is forwarded to the state for new eNodeB detection. The processes illustrated in FIGS. 8-12 may be performed, for example, in a network monitoring system, such as network monitoring system 106 described above in connection with FIG. 1.

Starting in step 800, the MME node discovery process receives S1-MME frames in step 801. In step 802, the process evaluates whether a GUMMEI parameter is present in the S1 message. If a GUMMEI parameter is present in the S1 message, the algorithm completely identifies the MME. In step 803, a key comprising MMEGI and MMEC is created from the GUMMEI parameter. Step 803 also gets the SCTP Association ID from the S1-MME message and, if present, the TAI or TAI list. With the information collected in step 803, the process moves to step 804 wherein it determines if the MMEGI-MMEC key is already present in the MME node topology of table 200 (FIG. 2). If the MMEGI-MMEC key is present in the table, then the associated MME node has already been discovered and the process moves to step 806. If the MMEGI-MMEC key is not found in the table, then the associated MME node is new to the network topology and the process moves to step 805 to create a new node.

In step 805, a new entry is created in MME table 200 with the MMEGI-MMEC key, the TAI or TAI list (if present), and a new system-defined GUMMEI GROUP ID. If the GUMMEI is not from an "old GUTI" (i.e. the GUTI for the former MME), then the SCTP Association ID is updated in MME table 200. A new set of associations are also created in TA-MMEC table 300 (FIG. 3). The process then moves to step 806 in which the fields of MME table 200 are populated using, for example, process 400 that is illustrated in FIG. 4. If TAI or TAI list is present in the S1-MME message, then the key TA-MMEC is created using the MMEC from the GUMMEI. The TA-MMEC table 300 is then searched using this key. If the key matches an entry in the TA-MMEC table 300, then the corresponding MMEGI-MMEC entry in MME table 200 is updated with the SCTP Association IDs from TA-MMEC table 300. The process then moves to step 807 and the MMEGI-MMEC key and SCTP Association IDs are sent to a State 2 process 900 (FIG. 9) to check for the presence of multiple GUMMEIs that are assigned to the same physical MME.

If GUMMEI is not present in step 802, then the process moves to step 808 to determine if S-TMSI is present in the frame. If the S-TMSI is present, then the process moves to step 809, which sends the S-TMSI, TAI list (if present), and S1-MME frame to State 3 process 1000 (FIG. 10) for S-TMSI handling.

If neither GUMMEI nor S-TMSI are present in the S1 frame in step 808, the process moves to step 810, which sends the S1-MME frame to State 4 process 1100 (FIG. 11) for eNodeB discovery.

In State 2, several logical MMEs can refer to the same physical MME node. FIG. 9 is a flowchart for an exemplary process for evaluating multiple GUMMEI and determining if two logical MMEs need to be group together into the same physical MME node. If two logical MMEs are grouped together, they are both assigned the same GUMMEI GROUP ID value. All MME node records that refer to the same physical MME node are grouped together even if different GUMMEI values are used. The SCTP Association ID is used to group together the related GUMMEI entries in the MME table.

Initial step 900 is entered from State 1 (FIG. 8). In step 901, MMEGI-MMEC and SCTP Association IDs are received from State 1, where MMEGI-MMEC key is associated with a newly discovered MME in State 1. In step 902, the MME table is checked to determine if there is another MMEGI-MMEC entry with the same SCTP association ID. If no other entries in the MME table have the same SCTP association ID, then the process proceeds to State 4 1100. If other entries in the MME table do have the same SCTP association ID, then there is a physical MME node in the network that has multiple GUMMEI values assigned to it. In step 903, the two MMEGI-MMEC entries with the same SCTP association ID are grouped together. These entries may be grouped together by assigning the same system-defined code, such as the GUMMEI GROUP ID, to both entries. The process then proceeds to State 4 1100 after grouping related MMEGI-MMEC entries.

In State 3, MMEC information from the S-TMSI is processed to complete the discovery of the MME nodes when MMEGI information is not available to create an MMEGI-MMEC key. FIG. 10 is a flowchart for an exemplary process for identifying MME nodes when GUMMEI information is not present in the received S1-MME frame processed in State 1. Because the S-TMSI includes the MMEC parameter—but not the MMEGI—it is possible to partially identify an MME node using the S-TMSI. In State 3, new MME nodes are not created in the MME table. Instead, an MME record is created only with TA, MMEC and SCTP Association ID information in the TA-MMEC table. This record can be resolved with MMEGI received in later S1 frames.

Initial step 1000 is entered from State 1 (FIG. 8). In step 1001, S-TMSI, TAI list and S1 frame data is received from State 1. In step 1002, a TA-MMEC key is created using the MMEC from the S-TMSI captured from the S1-MME frame and TAI from the same S1-MME frame. Then the TA-MMEC table is searched for entries with the same key values. Step 1003 determines if there are any entries with the same TA-MMEC key. If there are matching entries in the TA-MMEC table, then, in step 1004, these entries are updated with the SCTP Association ID from the S1 frame. If there are no entries in the TA-MMEC table with matching criteria in step 1003, then a new record is created in step 1005 with the TA-MMEC and SCTP Association ID.

In step 1006, the MME table is searched using the TA-MMEC just got from the S1-MME frame as a key. If an entry matches this criteria, then the algorithm updates the SCTP Association ID values in the MME table, if not already present, using the entry in the TA-MMEC table. In step 1007, the S1 frame is sent to State 4 1100 for eNB node discovery.

The same S1 frame can be used to discover both MME nodes and eNodeBs. In State 4, eNodeB nodes are discovered and linked to the SCTP Association ID. The eNodeBs are identified based on the presence of the eUTRAN CGI parameter, which includes the global identifier of the eNodeB—eNodeB Global ID. FIG. 11 is a flowchart for an exemplary process for discovering eNodeB topology. Initial step 1100 is entered from States 1 or 3 (FIGS. 8 and 10). In step 1101, an S1-MME frame is received, and in step 1102, the S1-MME frame is analyzed for the eUTRAN CGI. If no eUTRAN CGI is present, then the process returns to State 1 800 where the algorithm waits for and processes the next S1-MME frame.

If the eUTRAN CGI is present in step 1102, then the process moves to step 1103 in which the eNB Global ID key is obtained from the eUTRAN CGI parameter and used to search the eNB table 500. In step 1104, the process determines whether the eNB Global ID key is present in the eNB table. If the eNB Global ID key is present, then the process moves to step 1106. If the eNB Global ID key is not already present in the eNB table, then, in step 1105, a new eNB entry is created using the eUTRAN CGI parameter, which includes the eNB Global ID key. After creating the new entry, the process moves to step 1106 where the SCTP Association ID list for the eNB entry is updated. The process then moves to State 5 1200.

In State 5, the MME and eNodeB topology tables are scanned to bind together nodes using the SCTP Association IDs. State 5 identifies links between nodes in the network topology. FIG. 12 is a flowchart for an exemplary process for link creation. In State 5, the algorithm loops through the MME table (step 1201) and the eNodeB table (1203) to bind equal values of the SCTP Association ID parameter found in both tables. In step 1202, the lists of SCTP Association IDs are retrieved for each MME entry in the MME table. In step 1204, those SCTP Association IDs are compared to the SCTP Association IDs from the entries in the eNodeB table to identify matching values. If a match is found, then the relationship: MME-eNodeB-SCTP Association ID is stored in the network topology to identify new links between nodes. The SCTP Association ID comparison continues for each entry in the MME and eNodeB tables. When all the MME entries and eNodeB entries have been evaluated, the process returns to State 1 800 to process the next S1 frame.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A method of monitoring a telecommunications network, the network comprising a plurality of Mobility Management Entity (MME) nodes and a plurality of evolved UTRAN NodeB (eNodeB) nodes, the MME nodes and eNodeB nodes coupled by S1-MME interfaces, wherein a Stream Control Transmission Protocol (SCTP) association identifier is assigned to an SCTP association between interconnected MME and eNodeB nodes, the method comprising:

capturing an S1-MME message from the S1-MME interfaces via a monitoring probe in a network monitoring system;

creating an MMEGI-MMEC key comprising an MME Group Identifier (MMEGI) and an MME Code (MMEC) in the S1-MME message;

associating an SCTP association identifier to the S1-MME message;

identifying a Tracking Area Identity (TAI) in the S1-MME message;

adding the SCTP association identifier from the S1-MME message to a list of SCTP association identifiers for an entry in an MME topology table, wherein the MME topology table entry corresponds to the MMEGI-MMEC key;

creating a TA-MMEC key from the TAI and MMEC parameters in the S1-MME message; and adding one or more additional SCTP association identifiers to the list of SCTP association identifiers in the MME topology table, wherein the one or more additional SCTP association identifiers are from an entry in a TA-MMEC table, the TA-MMEC table entry corresponding to the TA-MMEC key; and selecting an SCTP association identifier from an MME entry in the MME topology table;

comparing the selected MME table SCTP association identifier to SCTP association identifiers stored in an entry in an eNodeB topology table; and if the selected MME table SCTP association identifier matches one of the eNodeB table SCTP association identifiers, then adding an entry to an MME-eNodeB links table, the MME-eNodeB links table entry comprising an MME identifier, an eNodeB identifier, and the matching SCTP association identifier.

2. The method of claim 1, wherein the S1-MME message comprises a Globally Unique MME Identity (GUMMEI), and wherein the MME Group Identifier (MMEGI) and the MME Code (MMEC) are part of the GUMMEI.

3. The method of claim 2, further comprising:
creating a new entry in the MME node topology table, if the MMEGI-MMEC key is not found in the MME node topology table, wherein the new entry comprises the MMEGI-MMEC key, the TAI, and a GUMMEI group identifier; and wherein the new entry further comprises SCTP association identifier associated with the S1-MME message, if the Globally Unique Temporary Identity (GUTI) in the S1-MME message is for a current MME.

4. The method of claim 3, further comprising:
searching the MME topology table for existing entries that include the SCTP association identifier associated to the S1-MME message; and
if an existing entry includes the SCTP association identifier from the S1-MME message, then grouping the existing entry and the new entry together in the MME topology table.

5. The method of claim 4, further comprising:
grouping the existing entry and the new entry by assigning a same GUMMEI group identifier to both entries.

6. The method of claim 1, wherein the MME identifier comprises the MMEGI, the MMEC, and a Globally Unique MME Identity (GUMMEI); and
wherein the eNodeB identifier comprises an eNodeB global identifier.

7. A method of monitoring a telecommunications network, the network comprising a plurality of Mobility Management Entity (MME) nodes and a plurality of evolved UTRAN NodeB (eNodeB) nodes, the MME nodes and eNodeB nodes coupled by S1-MME interfaces, wherein a Stream Control Transmission Protocol (SCTP) association identifier is assigned to an SCTP association between interconnected MME and eNodeB nodes, the method comprising:
capturing an S1-MME message from the S1-MME interfaces via a monitoring probe in a network monitoring system;
identifying an MME Code (MMEC) in the S1-MME message;
identifying a Tracking Area Identity (TAI) in the S1-MME message;
associate an SCTP association identifier to the S1-MME message;
creating a TA-MMEC key from the TAI and MMEC parameters in the S1-MME message;
adding the SCTP association identifier from the S1-MME message to a list of SCTP association identifiers for an entry in a TA-MMEC table, wherein the TA-MMEC entry corresponds to the TA-MMEC key; and
adding the SCTP association identifier from the S1-MME message to a list of SCTP association identifiers for an entry in an MME topology table, wherein the entry in the MME topology table corresponds to the TA-MMEC key; and
selecting an SCTP association identifier from an MME entry in the MME topology table;
comparing the selected MME table SCTP association identifier to SCTP association identifiers stored in an entry in an eNodeB topology table; and
if the selected MME table SCTP association identifier matches one of the eNodeB table SCTP association identifiers, then adding an entry to an MME-eNodeB links table, the MME-eNodeB links table entry comprising an MME identifier, an eNodeB identifier, and the matching SCTP association identifier.

8. The method of claim 7, further comprising:
determining that a Globally Unique MME Identity (GUMMEI) parameter is not present in the captured S1-MME message.

9. The method of claim 7, wherein the S1-MME message comprises an S-Temporary Mobile Subscriber Identity (S-TMSI), and wherein the MME Code (MMEC) is part of the S-TMSI.

10. The method of claim 7, further comprising:
creating a new entry in the TA-MMEC table if no entry in the TA-MMEC table matches the TA-MMEC key.

11. The method of claim 10, wherein the new entry comprises the SCTP association identifier from the S1-MME message.

12. The method of claim 7, further comprising:
selecting an SCTP association identifier from an MME entry in the MME topology table;
comparing the selected MME table SCTP association identifier to SCTP association identifiers stored in an entry in an eNodeB topology table; and
if the selected MME table SCTP association identifier matches one of the eNodeB table SCTP association identifiers, then adding an entry to an MME-eNodeB links table, the MME-eNodeB links table entry comprising an MME identifier, an eNodeB identifier, and the matching SCTP association identifier.

13. The method of claim 12, wherein the MME identifier comprises the MMEGI, the MMEC, and a Globally Unique MME Identity (GUMMEI); and
wherein the eNodeB identifier comprises an eNodeB global identifier.

* * * * *